Patented Jan. 16, 1951

2,538,313

UNITED STATES PATENT OFFICE 2,538,313

VAT DYESTUFFS

Theodor Holbro, Basel, and Walter Kern, Sissach, Switzerland, assignors to Ciba Limited, Basel, Switzerland, a Swiss firm No Drawing. Application February 10, 1947, Serial No. 727,723. In Switzerland February 12, 1946

13 Claims. (Cl. 260—368)

According to this invention valuable vat dyestuffs of the anthraquinone series are made by reacting an anthraquinone-2-carboxylic acid, which contains in the 1-position an amino group or a substituent convertible into an amino group and in the 4-position a cyano-group, with an amine, and, if desired, converting the substituent in the 1-position into an amino group.

The anthraquinone-2-carboxylic acids used as starting materials may contain in the 1-position an amino group, for example, a secondary amino group such as an alkylamino group containing an alkyl group of low molecular weight, for example, of not more than three carbon atoms, or advantageously a primary amino group. Alternatively, the 1-position may be occupied by a substituent which can be converted into an amino group at a later stage in the process. As such substituents there may be mentioned, for example, negative atoms or groups, for example, halogen atoms or nitro groups, which can be converted by an exchange reaction into amino groups. In some cases it may be of advantage to convert nitro groups by reduction into amino groups. Other substituents, such as acylamino groups, can, if desired, be converted by hydrolysis into free amino groups.

The aforesaid starting materials must also contain in the 4-position a cyano group. They may also contain further substituents of the kind usually present in vat dyestuffs so long as they do not interfere with the reaction in question, for example, alkyl or alkoxy groups, halogen atoms, or amine or cyano groups or the like.

Accordingly, there may be used as starting materials, for example, 4-cyano-anthraquinone-2-carboxylic acids which contain in the 1-position, for example, a nitro group or more especially an amino group.

In the process of the invention the aforesaid anthraquinone carboxylic acids are reacted with amines. In order that the reaction shall take place these amines must contain at least one exchangeable hydrogen atom. In other respects the amines may be of any desired nature, for example, of an aliphatic, cycloaliphatic, heterocyclic or aromatic nature.

Especially valuable dyestuffs are obtained by using amines capable of being vatted. Such amines may be derivatives of compounds containing at least three condensed rings of six carbon atoms and at least two cyclically bound carbonyl groups, and may be, for example, amino-anthraquinones or amines having more highly condensed (that is to say, containing more than three condensed rings) ring systems. They may contain further substituents, especially substituents of the kind usually present in vat dyestuffs, such as halogen atoms, alkoxy groups or amino groups, especially arylamino or acylamino groups, for example, phenylamino or benzoylamino groups. As examples, there may be mentioned 1- or 2-aminoanthraquinone, 1-amino-4- or -5-benzoylaminoanthraquinone, 1 - amino - 4 - methoxy- or 1 - amino - 4 - phenylamino-anthraquinone; and among the amines having more highly condensed ring systems 4-aminoanthraquinone - 1 - (N):2 - benzacridone and 4-amino-1:9-anthrapyrimidine may be mentioned. There also come into consideration amines having more than one, for example, two, amino groups, for instance, 1:4- or 1:5-diamino-anthraquinone.

For the purpose of reaction with the aforesaid amines the above mentioned anthraquinon carboxylic acids are advantageously used in the form of their reactive functional derivatives, for example, their acid halides, or used in the presence of agents which enable such a derivative, if desired, an anhydride, to be formed intermediately in the reaction mixture. The reaction is advantageously carried out in an inert solvent or diluent, such as nitrobenzene, mono-, di- or trichlorobenzene or naphthalene, and when an acid chloride is used advantageously at a moderately to highly raised temperature, for example, ranging from 80 to 200° C.

When the amine used contains in ortho-position to the amino group a suitable substituent, for example, an amino-oxy or mercapto group or a substituent convertible into such a group, ring closure to form an azole ring, for example, an imidazole, oxazole or thiazole ring, can be brought about in known manner simultaneously with or subsequently to the formation of an acid amide group.

The vat dyestuffs obtained by the invention may be used in known manner as pigment dyestuffs and also for dyeing or printing a very wide variety of fibers of animal and, more especially, vegetable character, such as silk, wool, cotton, artificial silk and staple fibers of regenerated cellulose. After conversion into salts of sulfuric acid leuco esters they may be used for dyeing and printing by the methods known for this class of dyestuffs.

There are obtained by the invention dyestuffs of which some yield very pure or full dyeings and some yield very fast dyeings, for example, fast to light and bucking, and especially dyestuffs of which the dyeings do not change or only change slightly in tint when soaped.

The following examples illustrate the invention, the parts being by weight unless otherwise stated, and the relationship of parts by weight to parts by volume being the same as that of the kilogram to the liter:

Example 1

14.6 parts of 1-amino-4-cyanoanthraquinone-2-carboxylic acid are converted into the acid chloride by being heated for one hour at 100° C. with 60 parts of thionyl chloride and 0.1 part of pyridine in 2000 parts of dry nitrobenzene. The excess of thionyl chloride is then removed by introducing a current of dry air. 17.1 parts of 1-amino-5-benzoylamino-anthraquinone are then introduced. After stirring the whole for 2 hours at 95–105° C. and then for a further 2 hours at 150–160° C. the reaction ceases. The precipitated dyestuff is separated by filtering with suction in the cold, washed with nitrobenzene and alcohol, and dried. In this manner an orange-red powder of the probable formula

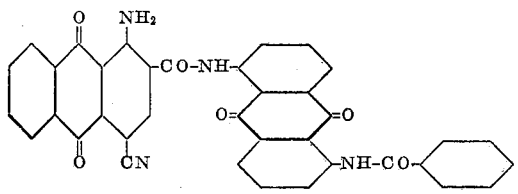

is obtained which dissolves in concentrated sulfuric acid with a brown-red coloration and dyes cotton clear red-orange tints from a bordeaux colored vat.

The 1 - amino - 4-cyanoanthraquinone-2-carboxylic acid used in this example may be obtained from 1 - amino - 4-bromoanthraquinone-2-carboxylic acid by being heated for 12 hours at 180° C. with cuprous cyanide in nitrobenzene in the presence of pyridine. It crystallises from nitrobenzene in small orange-red needles, which melt at 230° C. with decomposition.

Example 2

15.6 parts of 1-amino-4-cyanoanthraquinone-2-carboxylic acid chloride are introduced into a solution of 17.1 parts of 1-amino-4-benzoylamino-anthraquinone in 400 parts of dry ortho-dichlorobenzene at 90–100° C. The reaction mixture is heated for 2 hours at 90–100° C. with the introduction of a current of dry air, and then heated for a further two hours at 150–160° C. under the same conditions. The precipitated dyestuff is separated by filtering with suction while hot, washed with ortho-dichlorobenzene and alcohol, and dried. In this manner a dark red powder of the probable formula

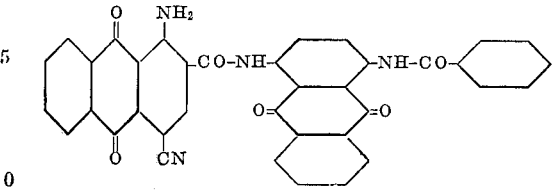

is obtained, which dissolves in concentrated sulfuric acid with a red coloration and dyes cotton clear yellowish red tints from a bordeaux colored vat.

The 1 - amino - 4-cyanoanthraquinone-2-carboxylic acid chloride used in this example may be prepared as follows:

14.6 parts of 1-amino-4-cyanoanthraquinone-2-carboxylic acid are finely dispersed in 2000 parts of dry nitrobenzene and heated at 100° C. with 60 parts of thionyl chloride with the addition of 0.1 part of pyridine for 3 hours, whereupon complete dissolution occurs except for a small quantity of impurities. The whole is filtered, and the reaction mixture is allowed to cool. 1-amino-4-cyanoanthraquinone-2-carboxylic acid chloride slowly crystallises in lustrous orange-red lamellae. It is separated by filtering with suction, washed with nitrobenzene and petroleum ether, and dried. It melts above 260° C. with decomposition.

Example 3

The 1 - amino - 4-benzoylaminoanthraquinone used in Example 2 is replaced by the amines given in the following table to produce the dyestuffs having the properties set forth therein:

| Amine | Dyestuff | | |
|---|---|---|---|
| | Coloration in sulfuric acid | Color of the vat | Dyeing on cotton |
| (a) 1-amino-5-benzoylamino-8-methoxy-anthraquinone | yellow-brown | bordeaux | scarlet-red. |
| (b) 1-amino-4-methoxy-anthraquinone | violet | yellowish bordeaux | Do. |
| (c) 1-amino-4-phenyl-aminoanthraquinone | red | bordeaux | violet. |
| (d) 4-amino-anthraquinone-1(N):2-benzacridone | dark green | violet | Do. |
| (e) 4-amino-1:9-anthrapyrimidine | brownish yellow | red-brown | orange. |

Example 4

1 mol of 1:4-diaminoanthraquinone is reacted with 2 mols of 1-amino-4-cyanoanthraquinone-2-carboxylic acid chloride by the process described in Example 2, and a red-brown powder is obtained, which dissolves in concentrated sulfuric acid with a red-brown coloration and dyes cotton pure rusty brown tints from a blue-violet vat.

By using 1:5-diaminoanthraquinone, instead of 1:4-diaminoanthraquinone, there is obtained an orange-red powder which dissolves in concentrated sulfuric acid with a brown-red coloration and dyes cotton orange-red tints from a bordeaux vat.

Example 5

The reaction product of the probable formula

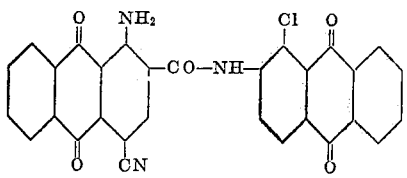

is prepared by the procedure described in Example 2 from 12.9 parts of 1-chloro-2-aminoanthraquinone and 15.6 parts of 1-amino-4-cyano-anthraquinone-2-carboxylic acid chloride, 15 parts of this reaction product, 1 part of copper acetate, 15 parts of fused sodium acetate and 250 parts of aniline are heated at the boil in a reflux apparatus, while stirring, for 6 hours. After cooling, the precipitated dyestuff is separated by filtering with suction, washed with aniline and alcohol, extracted by boiling with dilute hydrochloric acid, again filtered with suction, washed with water, and dried. It is a yellow-brown crystalline powder, which dissolves in concentrated sulfuric acid with a yellow-brown coloration and dyes cotton orange-red tints from a red vat. It has the probable constitution:

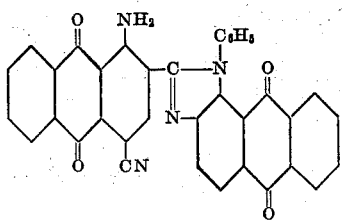

*Example 6*

29 parts of 2 - amino - 3 - bromanthraquinone, 31.2 parts of 1-amino-4-cyanoanthraquinone-2-carboxylic acid chloride and 0.1 part of cuprous chloride are heated in 400 parts of nitrobenzene in the course of one hour to 150° C. 24 parts of fused potassium acetate and 1 part of copper oxide are introduced. After stirring for a further 6 hours at 185-195° C. the formation of dyestuff is complete. The whole is filtered with suction while cold, the filter residue is washed with nitrobenzene and alcohol, and the reaction product is boiled with dilute hydrochloric acid. It is a yellow-brown powder, which dissolves in concentrated sulfuric acid with a yellow-brown coloration and dyes cotton orange-red tints from a brown-red vat. The dyestuff has the probable constitution:

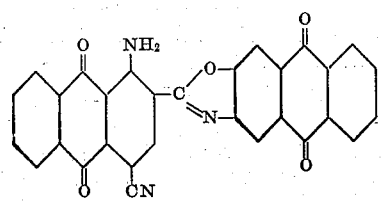

*Example 7*

15.6 parts of 1-amino-4-cyanoanthraquinone-2-carboxylic acid chloride are introduced at 100° C. into a solution of 12.8 parts of 1-mercapto-2-aminoanthraquinone in 500 parts of dry trichlorobenzene. After stirring for 2 hours at 145-155° C., and for a further 2 hours at the boiling temperature, the precipitated dyestuff is separated by filtering with suction while hot, washed with trichlorobenzene and alcohol, and dried. It is a brown powder, which dissolves in concentrated sulfuric acid with an olive coloration and dyes cotton brown-red tints from a violet vat. It has the probable constitution:

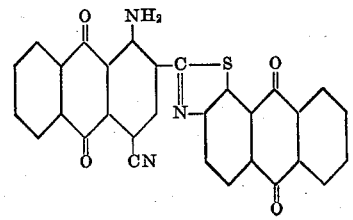

*Example 8*

The 14.6 parts of 1-amino-4-cyanoanthraquinone-2-carboxylic acid used in Example 1 are replaced by 15.3 parts of 1-methylamino-4-cyanoanthraquinone-2-carboxylic acid, and there is obtained a dyestuff which dyes cotton red tints from a bordeaux colored vat.

The 1-methylamino-4-cyanoanthraquinone-2-carboxylic acid used in this example may be prepared from 1-methylamino-4-bromoanthraquinone-2-carboxylic acid by heating the latter for 12 hours at 180° C. with cuprous cyanide in nitrobenzene in the presence of pyridine. It is a red-brown powder which melts at 290° C. with decomposition.

*Example 9*

1 part of the dyestuff obtained as described in Example 2 is vatted in 200 parts of water with the addition of 4 parts by volume of caustic soda solution of 36° Bé. and 2 parts of sodium hydrosulfite at 60° C. The resulting stock vat is added to a dyebath of 2000 parts of water containing 4 parts by volume of caustic soda solution of 36° Bé. and 2 parts of sodium hydrosulfite. 100 parts of cotton are entered at 40° C., 10 parts of sodium chloride are added after ¼ hour, and dyeing is carried on for one hour while the temperature is raised to 50° C. The goods are then oxidized and finished in the usual manner. The cotton is dyed a yellowish red tint.

What we claim is:

1. A vat dyestuff of the general formula

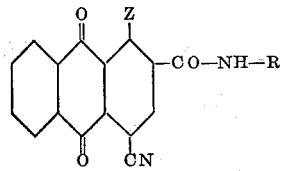

wherein Z stands for a member of the group consisting of $NH_2$ and NH-alkyl with an alkyl radical of at most three carbon atoms and R stands for the radical of an aromatic compound.

2. A vat dyestuff of the general formula

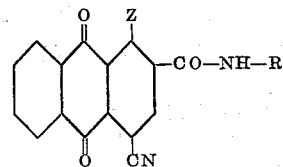

wherein Z stands for a member of the group consisting of $NH_2$ and NH-alkyl with an alkyl radical of at most three carbon atoms and R stands for the radical of an aromatic compound containing at least three condensed six-membered carbon rings and at least two cyclically bound carbonyl groups.

3. A vat dyestuff of the general formula

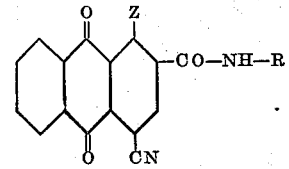

wherein Z stands for a member of the group consisting of $NH_2$ and NH-alkyl with an alkyl radical of at most three carbon atoms and R stands for the radical of a vattable compound containing the anthracene skeleton.

4. A vat dyestuff of the general formula

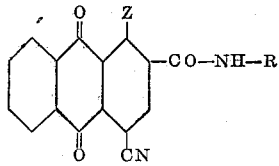

wherein Z stands for a member of the group consisting of NH₂ and NH-alkyl with an alkyl radical of at most three carbon atoms and R stands for an anthraquinone radical.

5. A vat dyestuff of the general formula

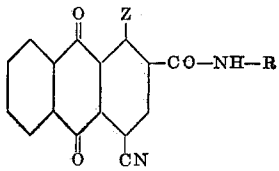

wherein Z stands for a member of the group consisting of NH₂ and NH-alkyl with an alkyl radical of at most three carbon atoms and R stands for an acylaminoanthraquinone radical.

6. A vat dyestuff of the general formula

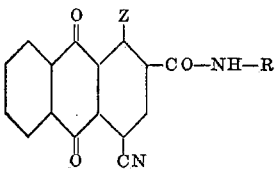

wherein Z stands for a member of the group consisting of NH₂ and NH-alkyl with an alkyl radical of at most three carbon atoms and R stands for a methoxyanthraquinone radical.

7. A vat dyestuff of the general formula

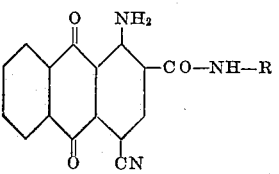

wherein R stands for the radical of a vattable compound containing the anthracene skeleton.

8. A vat dyestuff of the general formula

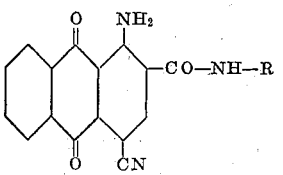

wherein R stands for an anthraquinone radical.

9. A vat dyestuff of the general formula

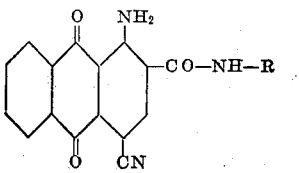

wherein R stands for an acylaminoanthraquinone radical.

10. A vat dyestuff of the general formula

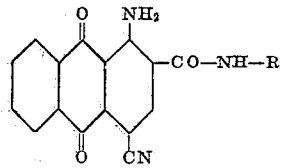

wherein R stands for a methoxyanthraquinone radical.

11. The vat dyestuff of the formula

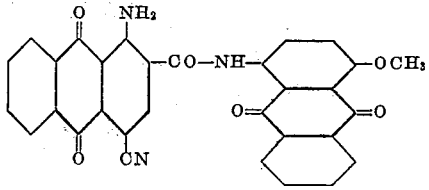

12. The vat dyestuff of the formula

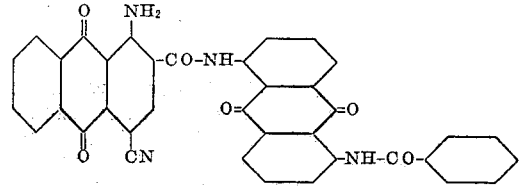

13. The vat dyestuff of the formula

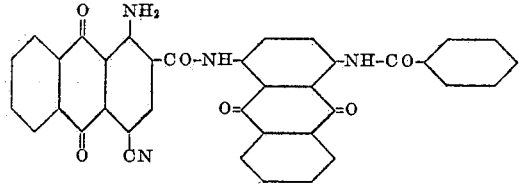

THEODOR HOLBRO.
WALTER KERN.

REFERENCES CITED

The following references are of record in the file of this patent:

UNITED STATES PATENTS

| Number | Name | Date |
|---|---|---|
| 1,539,689 | Nawiasky et al. | May 26, 1925 |
| 1,728,216 | Schirmacher et al. | Sept. 17, 1929 |
| 2,147,569 | Berthold et al. | Feb. 14, 1939 |
| 2,335,698 | Rintelman | Nov. 30, 1943 |

FOREIGN PATENTS

| Number | Country | Date |
|---|---|---|
| 465,769 | Great Britain | May 14, 1937 |

OTHER REFERENCES

Schaarschmidt: "Annalen der Chemie," vol. 405 (1914), pages 108, 111, 120, 121.